US009632951B2

(12) United States Patent
Huang et al.

(10) Patent No.: US 9,632,951 B2
(45) Date of Patent: Apr. 25, 2017

(54) CACHE MEMORY

(71) Applicant: NATIONAL SUN YAT-SEN UNIVERSITY, Kaohsiung (TW)

(72) Inventors: Ing-Jer Huang, Kaohsiung (TW);
Chun-Hung Lai, Kaohsiung (TW);
Yun-Chung Yang, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

(21) Appl. No.: 14/716,242

(22) Filed: May 19, 2015

(65) Prior Publication Data
US 2016/0275020 A1    Sep. 22, 2016

(30) Foreign Application Priority Data

Mar. 16, 2015 (TW) .............................. 104108336 A

(51) Int. Cl.
G06F 12/00 (2006.01)
G06F 13/00 (2006.01)
G06F 12/14 (2006.01)

(52) U.S. Cl.
CPC ...... *G06F 12/1433* (2013.01); *G06F 12/1491* (2013.01); *G06F 2212/1052* (2013.01)

(58) Field of Classification Search
None
See application file for complete search history.

(56) References Cited

U.S. PATENT DOCUMENTS

| 5,367,653 | A | * | 11/1994 | Coyle | ................. | G06F 12/0864 |
| | | | | | | 711/128 |
| 5,410,669 | A | * | 4/1995 | Biggs | .................. | G06F 12/0802 |
| | | | | | | 711/118 |
| 6,128,684 | A | * | 10/2000 | Okayama | ............ | G06F 12/1027 |
| | | | | | | 710/109 |
| 6,594,728 | B1 | * | 7/2003 | Yeager | ................ | G06F 12/0851 |
| | | | | | | 711/120 |

(Continued)

FOREIGN PATENT DOCUMENTS

EP    1111511 A1    6/2001

OTHER PUBLICATIONS

Zhiguo Ge, et al, "DRIM : A Low Power Dynamically Reconfigurable Instruction Memory Hierarchy for Embedded Systems," *Design, Automation & Test in Europe Conference & Exhibition, 2007*, pp. 1-6.

*Primary Examiner* — Sean D Rossiter
(74) *Attorney, Agent, or Firm* — Muncy, Geissler, Olds & Lowe, P.C.

(57) ABSTRACT

A cache memory includes a tag memory array and a data memory array. A control register records a reconfiguration status of at least one cache way, a start address of the tag memory array, and a start address of the data memory array. A memory controller is electrically connected to the tag memory array, the data memory array, and the control register. The memory controller controls a data access state of the tag memory array according to the mode byte and the tag base address. The memory controller controls a data access state of the data memory array according to the mode byte and the data base address. A selection module is electrically connected between the tag memory array, the data memory array, and the memory controller. The cache memory solves the problem of idle tag memory of the tag memory array.

4 Claims, 4 Drawing Sheets

(56) References Cited

U.S. PATENT DOCUMENTS

| | | | | |
|---|---|---|---|---|
| 7,653,785 B2* | 1/2010 | Bailey | ............... | G06F 12/0802 |
| | | | | 711/118 |
| 7,894,355 B2* | 2/2011 | Bennett | ............... | H04L 43/0852 |
| | | | | 370/252 |
| 8,904,153 B2* | 12/2014 | Eichenberger | ...... | G06F 15/8069 |
| | | | | 711/118 |
| 2006/0106946 A1* | 5/2006 | Agarwal | ............... | H04L 69/16 |
| | | | | 709/250 |
| 2015/0113228 A1* | 4/2015 | Huang | ............... | G06F 12/0848 |
| | | | | 711/143 |

* cited by examiner

| 31 | | 10 9 | | 5 4 | | 0 |
|---|---|---|---|---|---|---|
| tag | | set index | | byte offset | | |

FIG. 2a

| 31 | | 12 11 | 10 9 | | 5 4 | | 0 |
|---|---|---|---|---|---|---|---|
| data base address | | cache way | data draft index | | byte offset | | |

FIG. 2b

| 31 | | 9 8 | 7 6 | | 2 1 | | 0 |
|---|---|---|---|---|---|---|---|
| tag base address | | cache way | tag draft index | | byte offset | | |

FIG. 2c

CACHE MEMORY

BACKGROUND OF THE INVENTION

1. Field of the Invention

The present invention relates to a cache memory and, more particularly, to a cache memory capable of using idle tag memories of a tag memory array after reconfiguration.

2. Description of the Related Art

A conventional processor generally includes a core and a cache memory. The core is used to execute programs. The cache memory includes a cache controller and a plurality of cache ways. Each cache way includes a data memory and a tag memory for storing data frequently used by the core.

Most of conventional cache memories includes the function of a scratchpad memory (SMP) for predicting the execution time while reducing the power consumption. The scratchpad memory can be in the form of a dedicated memory which increases the costs. Thus, reconfigurable memories are developed, examples of which have been disclosed in EP 1111511 A1 entitled "Cache with Multiple Fill Modes" and disclosed by Zhiguo Ge, Weng-Fai Wong, and Hock-Beng Lim, "DRIM: A Low Power Dynamically Reconfigurable Instruction Memory Hierarchy for Embedded Systems", ISBN 978-3-9810801-2-4; 2007 Design, Automation and Test in Europe Conference and Exposition.

However, the addresses in the scratchpad memories are fixed after reconfiguration, such that the access of the tag memories in the cache ways can be ignored. As a result, the tag memory array after reconfiguration (about 6.25-12.5% of the whole cache memory capacity) become idle and is not used, leading to a waste of the storage resource. In a conventional approach, the number of tag memories is reduced to improve this situation, but the flexibility tolerance of reconfiguration is also reduced.

In view of the disadvantages of the conventional techniques in actual use, a need exists for an improved cache memory to increase the utility.

SUMMARY OF THE INVENTION

An objective of the present invention is to provide a cache memory in which the idled tag memories after reconfiguration can be used to store data.

The present invention provides a cache memory including a tag memory array having at least one tag memory. A data memory array includes at least one data memory. The at least one data memory and the at least one tag memory together form at least one cache way. A control register is provided for storing a mode byte, a tag base address, and a data base address. The mode byte records a reconfiguration status of the at least one cache way. The tag base address is a start address of the tag memory array. The data base address is a start address of the data memory array. A memory controller is electrically connected to the tag memory array, the data memory array, and the control register. The memory controller controls a data access state of the tag memory array according to the mode byte and the tag base address. The memory controller controls a data access state of the data memory array according to the mode byte and the data base address. A selection module is electrically connected between the tag memory array, the data memory array, and the memory controller. The selection module permits the memory controller to control the tag memory array and the data memory array to access data.

The memory controller can include a tag draft controller and a data draft controller. The tag draft controller is electrically connected to the tag memory array, the control register, the selection module, a cache address port, and a cache data write-in port. The data draft controller is electrically connected to the data memory array, the control register, the selection module, the cache address port, and the cache data write-in port.

The tag draft controller can include a tag comparator, a first tag multiplexer, a tag AND gate, a second tag multiplexer, and a third tag multiplexer. The tag comparator is electrically connected to the tag AND gate, the control register, and the cache address port. The first tag multiplexer is electrically connected to the control register and the cache address port. The tag AND gate is electrically connected to the tag comparator and the first tag multiplexer. The second tag multiplexer is electrically connected to the tag AND gate and the cache address port. The third tag multiplexer is electrically connected to the tag AND gate, the cache address port, and the cache data write-in port.

The data draft controller can include a data comparator, a first data multiplexer, a data AND gate, and a second data multiplexer. The data comparator is electrically connected to the data AND gate, the control register, and the cache address port. The first data multiplexer is electrically connected to the control register and the cache address port. The data AND gate is electrically connected to the data comparator and the first data multiplexer. The data multiplexer is electrically connected to the data AND gate and the cache address port.

The tag memory array can include a tag input port, a tag address port, and a tag output port. The data memory array includes a data input port, a data address port, and a data output port. The selection module includes a first multiplexer, a second multiplexer, a plurality of comparators, a way selector, a third multiplexer, a fourth multiplexer, and a fifth multiplexer. The first multiplexer is electrically connected to the tag address port of the tag memory array, the data address port of the data memory array, and the tag draft controller and the data draft controller of the memory controller. The second multiplexer is electrically connected to the fifth multiplexer, the tag output port of the tag memory array, and the tag draft controller of the memory controller. The plurality of comparators is electrically connected to the way selector, the tag output port, and the cache address port. The third multiplexer is electrically connected to the way selector, the fourth multiplexer, and the data draft controller of the memory controller. The fourth multiplexer is electrically connected to the third multiplexer, the fifth multiplexer, and the data output port of the data memory array. The fifth multiplexer is electrically connected to the second multiplexer, the fourth multiplexer, the tag draft controller of the memory controller, and a cache data write-out port.

The present invention will become clearer in light of the following detailed description of illustrative embodiments of this invention described in connection with the drawings.

BRIEF DESCRIPTION OF THE DRAWINGS

FIGS. 2(a), 2(b), and 2(c) are schematic diagrams of address formats of the cache memory of embodiment according to the present invention.

DETAILED DESCRIPTION OF THE INVENTION

As used herein, the term "multiplexer" refers to a functional block capable of selectively outputting one of a plurality of digital logic state values, which can be appreciated by one having ordinary skill in the art.

As used herein, the term "comparator" refers to a functional block capable of outputting a comparison result after comparing two logic state values, which can be appreciated by one having ordinary skill in the art.

As used herein, the term "AND logical gate" refers to a functional block capable of outputting a logic value after conducting a logical AND operation of a plurality of logic state values, which can be appreciated by one having ordinary skill in the art.

Figure 1:
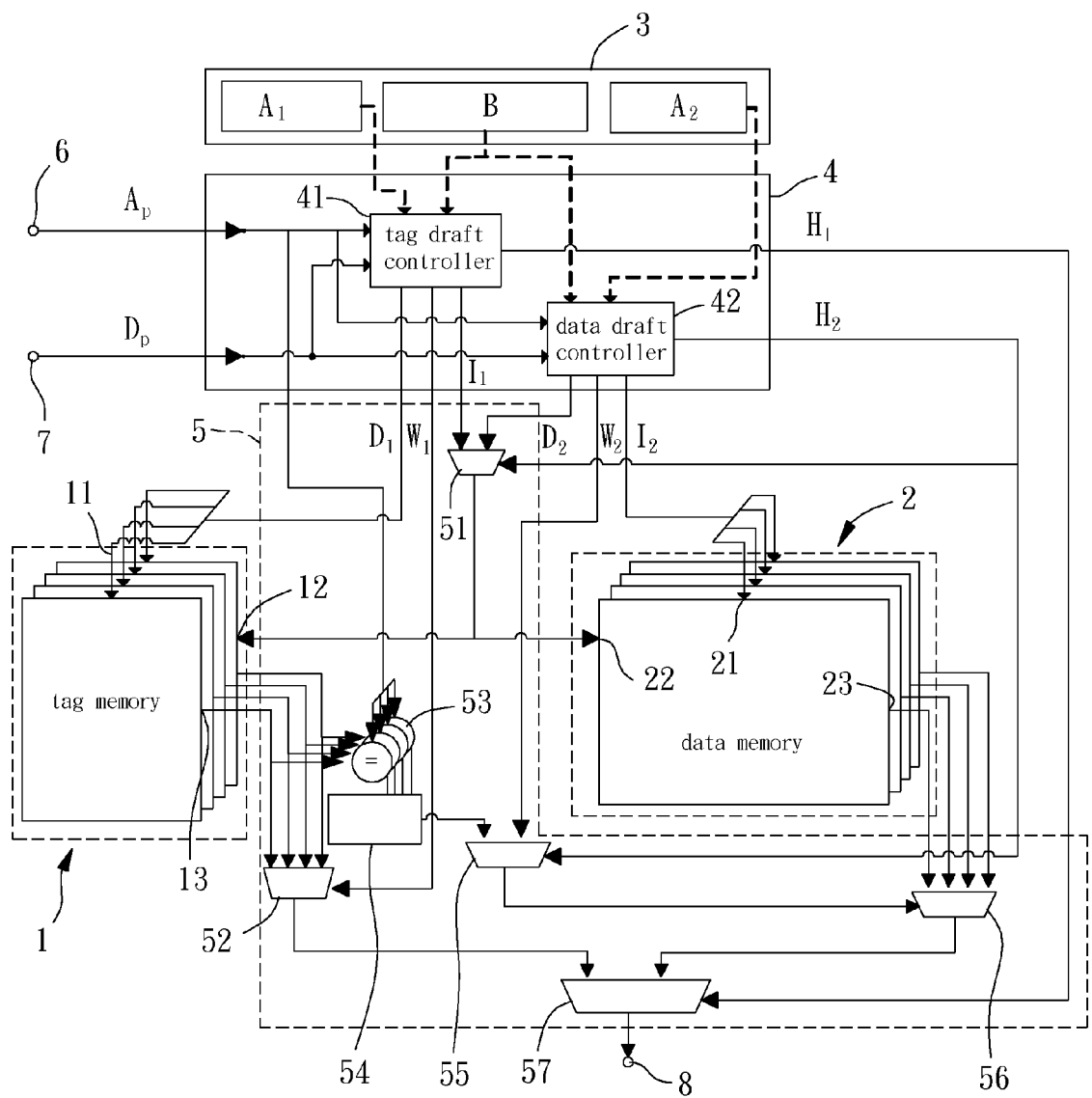
FIG. 1 is a schematic diagram of a cache memory of an embodiment according to the present invention.

FIG. 1 is a schematic diagram of a cache memory of an embodiment according to the present invention. In this embodiment, the cache memory includes a tag memory array 1, a data memory array 2, a control register 3, a memory controller 4, and a selection module 5. The tag memory array 1 and the data memory array 2 are used to store data. The control register 3 is used to temporarily store the reconfiguration status of the tag memory array 1 and the data memory array 2. The memory controller 4 is electrically connected to the tag memory array 1, the data memory array 2, and the control register 3. The selection module 5 is electrically connected between the tag memory array 1, the data memory array 2, and the memory controller 4. In this embodiment, the cache memory further includes a cache address port 6, a cache data write-in port 7, and a cache data write-out port 8. The cache address port 6 and the cache data write-in port 7 are electrically connected to the memory controller 4. The cache data write-out port 8 is electrically connected to the selection module 5.

In this embodiment, the cache address port 6 and the cache data write-in port 7 are respectively used to input a processor address $A_p$ and a processor datum $D_p$. The cache data write-out port 8 is used to output a cache datum. The processor address $A_p$ can include 32 bits (which can be expressed as [31:0]). As shown in FIG. 2(a), the data format of a conventional cache memory address locating method can be tag [31:10], set index [9:5], byte offset [4:0]. The data format of the data draft address locating method according to the present invention shown in FIG. 2(b) can be data base address [31:12], cache way [11:10], data draft index [9:5], byte offset [4:0]. The data format of the tag draft address locating method according to the present invention shown in FIG. 2(c) can be tag base address [31:9], cache way [8:7], tag draft index [6:2], byte offset [1:0]. However, the present invention is not limited to these data formats.

Still referring to FIG. 1, the tag memory array 1 includes a tag input port 11, a tag address port 12, and a tag output port 13. The data memory array 2 includes a data input port 21, a data address port 22, and a data output port 23. In this embodiment, the tag memory array 1 includes at least one tag memory, the data memory array 2 includes at least one data memory, and the at least one data memory and the at least one tag memory together form at least one cache way. Operation of the at least one cache way is substantially the same as operation of the cache way of a conventional cache memory. In this embodiment, operations of four cache ways are described by way of example. Each cache way can be reconfigured to form a scratchpad memory (SPM) including a tag SPM and a data SPM. However, the present invention is not limited to this arrangement.

Still referring to FIG. 1, the control register 3 is used to store a mode byte B, a tag base address $A_1$, and a data base address $A_2$. The mode byte B records a reconfiguration status of the cache way. The tag base address $A_1$ can be used as the start address of the tag memory array 1. The data base address $A_2$ can be used as the start address of the data memory array 2. In this embodiment, the mode byte B includes four bits to record whether the four cache ways are reconfigured into scratchpad memories. For example, bit value "0001" represents the first cache way has be reconfigured while the other three are not reconfigured. An example of generation of the mode byte B, the tag base address $A_1$, and the data base address $A_2$ will be set forth hereinafter.

In an example, a user can design programs for the mode byte B, the tag base address $A_1$, and the data base address $A_2$ according to needs, and the settings can be conducted by the processor. Assume there are four cache ways and the user is intended to reconfigure two of the four cache ways into scratchpad memories, two bits of the mode byte B representing the two cache ways to be reconfigured are set to be 1. With regard to the tag base address $A_1$ and the data base address $A_2$, the user can use a segment of an idle section of the memory map address as the memory map address for the tag/data SPM. After setting the tag base address $A_1$ and the data base address $A_2$, when the processor is accessing the tag/data SPM memory map address, it will be directed to the tag/data SPM in the cache memory.

Still referring to FIG. 1, the memory controller 4 can control the data access state of the tag memory array 1 according to the mode byte B and the tag base address $A_1$. Furthermore, the memory controller 4 controls a data access state of the data memory array 2 according to the mode byte B and the data base address $A_2$. In this embodiment, the memory controller 4 includes a tag draft controller 41 and a data draft controller 42. The tag draft controller 41 is electrically connected to the tag memory array 1, the control register 3, the selection module 5, the cache address port 6, and the cache data write-in port 7, is used to input the processor address $A_p$, the processor datum $D_p$, the mode byte B, and the tag base address $A_1$, and is used to output a tag draft datum $D_1$, a tag draft way $W_1$, a tag draft index $I_1$, and a tag draft hit $H_1$. The data draft controller 42 is electrically connected to the data memory array 2, the control register 3, the selection module 5, the cache address port 6, and the cache data write-in port 7, is used to input the processor address $A_p$, the processor datum $D_p$, the mode byte B, and the data base address $A_2$, and is used to output a data draft datum $D_2$, a data draft way $W_2$, a data draft index $I_2$, and a data draft hit $H_2$. Furthermore, a swapping strategy can be built in the memory controller 4 for loading data in an external memory into the cache memory. The memory controller 4 can select the cache ways that can be sacrificed. The swapping strategy can be, but not limited to, a conventional cache replacement method, which can be appreciated by one having ordinary skill in the art.

Figure 3:
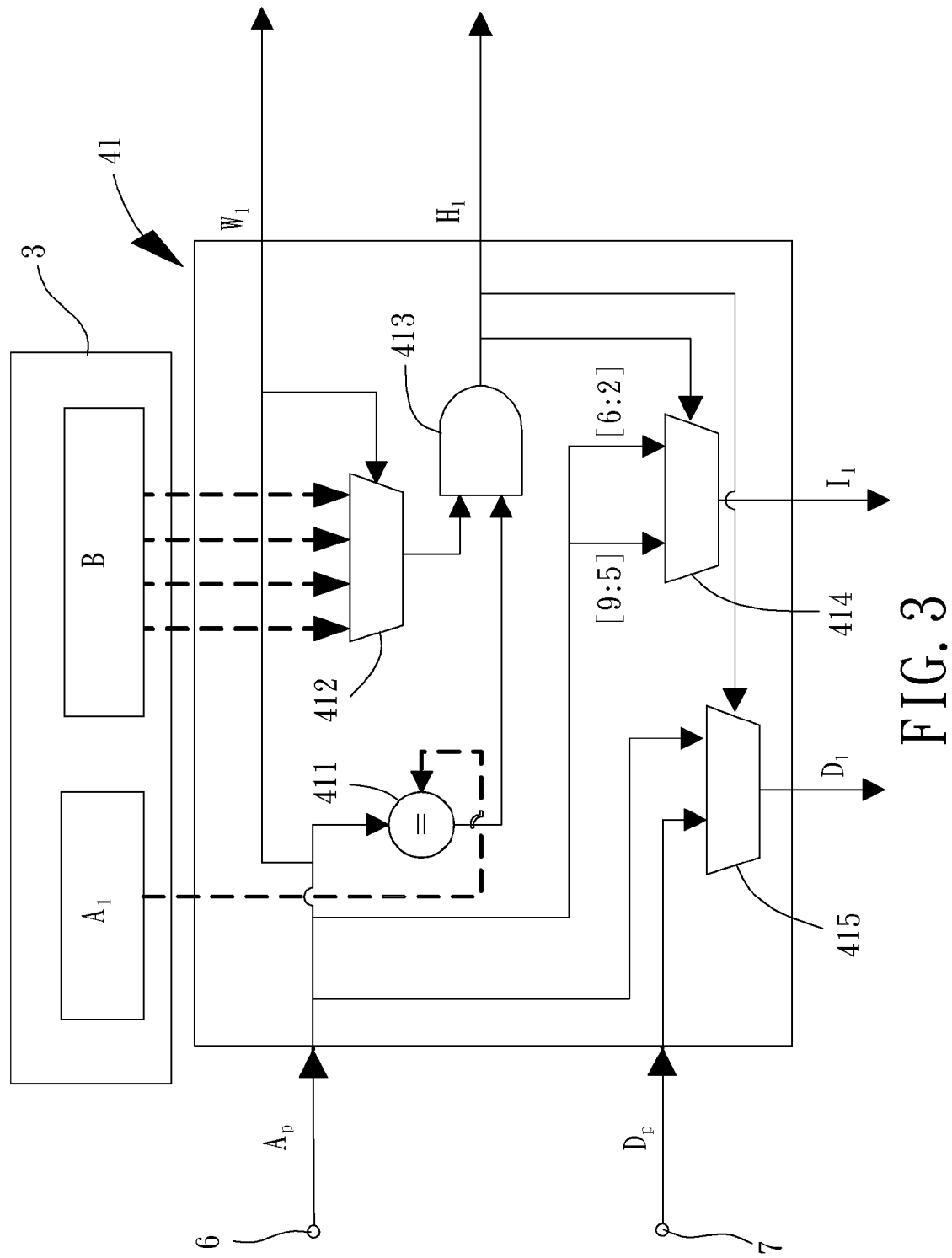
FIG. 3 is a schematic diagram of a tag draft controller of the cache memory of the embodiment according to the present invention.

FIG. 3 is a schematic diagram of the tag draft controller 41 of the cache memory of the embodiment according to the present invention. In this embodiment, the tag draft controller 41 includes a tag comparator 411, a first tag multiplexer 412, a tag AND gate 413, a second tag multiplexer 414, and a third tag multiplexer 415. The tag comparator 411 is electrically connected to the tag AND gate 413, the control register 3, and the cache address port 6, is used to input the tag and the tag base address $A_{tb}$, and generates a tag comparison value after comparison. The first tag multiplexer 412 is electrically connected to the control register 3 and the cache address port 6, is used to input the mode byte B, and selects a tag mode value from the cache line offset of the processor address $A_p$. Furthermore, the cache way bit [8:7] (see FIG. 2(c)) in the processor address $A_p$ can serve as the tag draft way $W_1$. The tag AND gate 413 is electrically connected to the tag comparator 411 and the first tag multiplexer 412 and is used to input the tag mode value and the tag comparison value. The tag draft hit $H_1$ is generated after a logical AND operation.

The second tag multiplexer 414 is electrically connected to the tag AND gate 413 and the cache address port 6. According to the tag draft hit $H_1$, the second tag multiplexer 414 can be used to select the tag draft index (such as the processor address $A_p$ bit [6:2] in FIG. 2(c)) or the set index of the conventional cache memory address locating method (such as the processor address $A_p$ bit [9:5] in FIG. 2(a)) as the tag draft index $I_1$. The selection is based on whether the current address falls within the tag SPM memory map address segment (which can be known by the comparison result of the tag comparator 411) and whether the tag memory corresponding to the memory map address segment (according to the processor address $A_p$ bit [8:7] in FIG. 2(c)) has been reconfigured into a tag SPM (the reconfiguration can be known by a value outputted by the first tag multiplexer 412 representing the operation mode bit of the cache way). If both are true, the access to be conducted is a tag SPM access, not an ordinary cache memory access. Thus, the tag draft address locating method of FIG. 2(c) is used in the operation to select the tag draft index as the set index of the tag memory and the data memory. The third tag multiplexer 415 is electrically connected to the tag AND gate 413, the cache address port 6, and the cache data write-in port 7 and is used to select the processor datum $D_p$ or the tag of the processor address $A_p$ as the tag draft datum $D_1$ according to the tag draft hit $H_1$.

Figure 4:
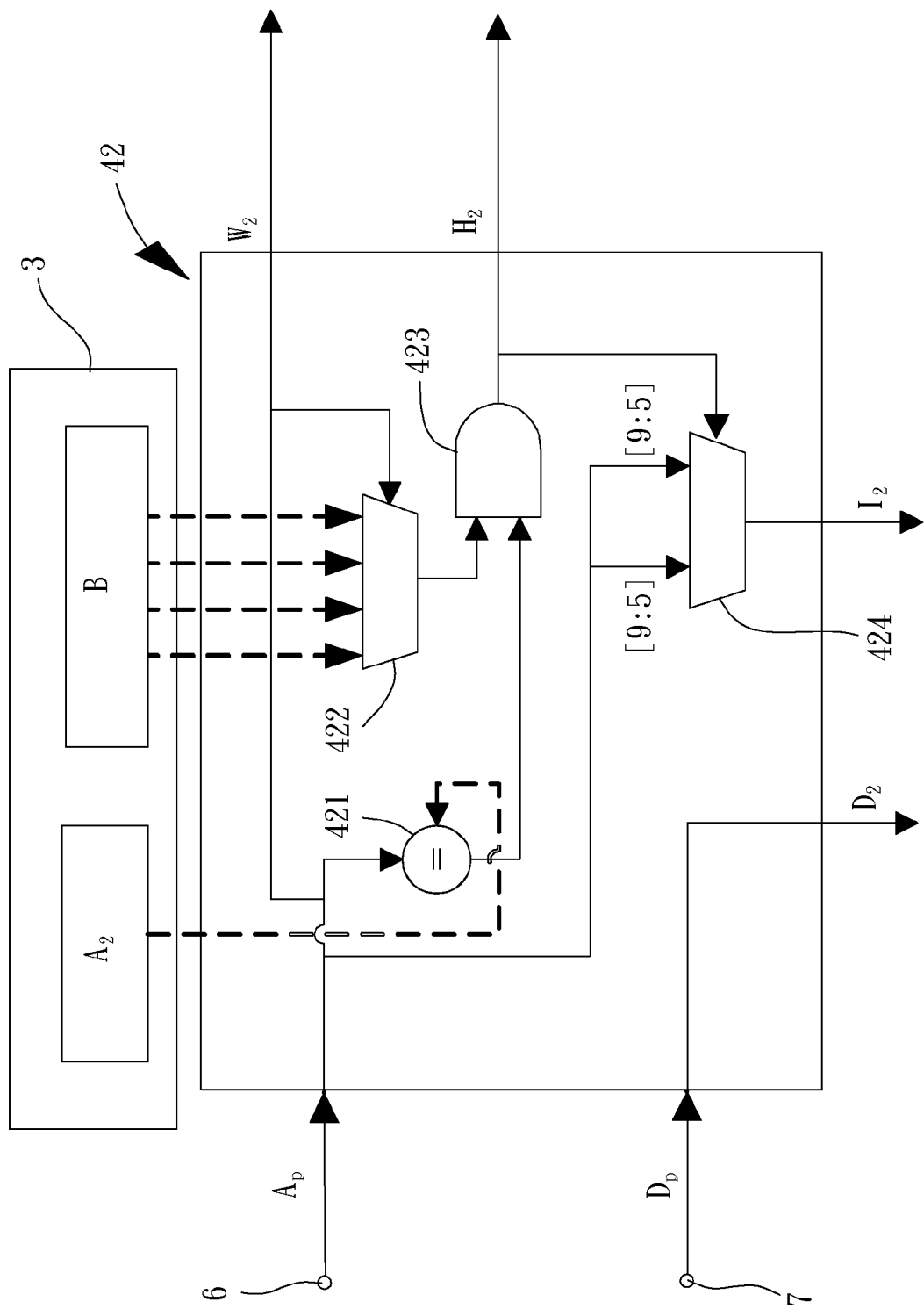
FIG. 4 is a schematic diagram of a data draft controller of the cache memory of the embodiment according to the present invention.

FIG. 4 is a schematic diagram of the data draft controller 42 of the cache memory of the embodiment according to the present invention. The data draft controller 42 includes a data comparator 421, a first data multiplexer 422, a data AND gate 423, and a second data multiplexer 424. The data comparator 421 is electrically connected to the data AND gate 423, the control register 3, and the cache address port 6, is used to input the tag of the processor address $A_p$ and the data base address $A_2$, and is used to generate a data comparison value after comparison. The first data multiplexer 422 is electrically connected to the control register 3 and the cache address port 6, is used to input the mode byte B, and selects a data mode value from the cache line offset in the processor address $A_p$. Furthermore, the cache way bit [11:10] (see FIG. 2(b)) in the processor address $A_p$ can serve as the data draft way $W_2$. The data AND gate 423 is electrically connected to the data comparator 421 and the first data multiplexer 422 and is used to input the data mode value and the data comparison value. The data draft hit $H_2$ is generated after a logical AND operation.

The second data multiplexer 424 is electrically connected to the data AND gate 423 and the cache address port 6. According to the data draft hit $H_2$, the second data multiplexer 424 can be used to select the data draft index of the data draft address locating method (such as the processor address $A_p$ bit [9:5] in FIG. 2(b)) or the set index of the conventional cache memory address locating method (such as the processor address $A_p$ bit [9:5] in FIG. 2(a)) as the data draft index $I_2$. The selection is based on whether the current address falls within the data SPM memory map address segment (which can be known by the comparison result of the data comparator 421) and whether the data memory corresponding to the memory map address segment (according to the processor address $A_p$ bit [11:10] of FIG. 2(b)) has been reconfigured into a data SPM (the reconfiguration can be known by a value outputted by the first tag multiplexer 412 representing the operation mode bit of the cache way). If both are true, the access to be conducted is a data SPM access, not an ordinary cache memory access. Thus, the data draft address locating method of FIG. 2(b) is used in the operation to select the data draft index as the set index of the tag memory and the data memory. Furthermore, the tag of the processor address $A_p$ is used as the data draft datum $D_2$. Since the selected index bit is $A_p$ bit [9:5], the second data multiplexer 424 can be omitted, and the processor address $A_p$ bit [9:5] is selected as the data draft index $I_2$ to reduce the energy consumption of the circuit.

Still referring to FIG. 1, the selection module 5 permits the memory controller 4 to control the tag memory array 1 and the data memory array 2 to access data. In this embodiment, the selection module 5 includes a first multiplexer 51, a second multiplexer 52, a plurality of comparators 53, a way selector 54, a third multiplexer 55, a fourth multiplexer 56, and a fifth multiplexer 57. The first multiplexer 51 is electrically connected to the tag address port 12 of the tag memory array 1, the data address port 22 of the data memory array 2, and the tag draft controller 41 and the data draft controller 42 of the memory controller 4, such that the data draft hit $H_2$ can be based to select the tag draft index $I_1$ or the data draft index $I_2$ can be selected as a set index for obtaining the cache line data in the tag memory array 1 or the data memory array 2. The second multiplexer 52 is electrically connected to the fifth multiplexer 57, the tag output port 13 of the tag memory array 1, and the tag draft controller 41 of the memory controller 4, such that a cache way datum in the tag memory array 1 is selected according to the tag draft way $W_2$ and is sent to the fifth multiplexer 57.

The comparators 53 are electrically connected to the way selector 54, the tag output port 13 of the tag memory array 1, and the cache address port 6. The comparators 53 are used to compare the tag in the processor address $A_p$ with the tag data stored in the cache ways of the tag memory array 1 (the tag memory array 1 is used to store the tag corresponding to the cache line), and the comparison result is sent to the way selector 54. It is a cache hit if the comparison result in any cache way is identical. On the other hand, it is a cache miss (the data corresponding to the address is not in the cache memory) if none of the comparison results are identical. In the case of a cache hit, only one cache way comparison result is true. Thus, the datum outputted by the cache way in the data memory array 2 (through selection by the fourth multiplexer 56) is the datum requested by the processor at the present time.

Furthermore, when the way selector 54 is merely used to proceed with an ordinary cache memory access, the coding (for example, if the comparison result is 0100, MSB represents way3, LSB represents way0; if only way2 is hit, the coding is 2'b10) of the cache way (such as way0-3) in which the cache hit occurs selects the cache way to the fourth multiplexer 56 for input purposes, because the input decided by a 4-to-1 multiplexer includes 2 bits. Thus, the way selector 54 undergoes a conversion of coding (from 0100 to 2'b10).

The third multiplexer 55 is electrically connected to the way selector 54, the fourth multiplexer 56, and the data draft controller 42 of the memory controller 4, such that the way value outputted by the data draft way $W_2$ or the way selector 54 is selected according to the data draft hit $H_2$ and is sent to the fourth multiplexer 56. The fourth multiplexer 56 is electrically connected to the third multiplexer 55, the fifth multiplexer 57, and the data output port 23 of the data memory array 2, such that the way value outputted by the third multiplexer 55 can be based to select a cache way datum in the data memory array 2. The fifth multiplexer 57 is electrically connected to the second multiplexer 52, the fourth multiplexer 56, the tag draft controller 41 of the memory controller 4, and the cache data write-out port 8. The datum from tag memory array 1 or the data memory array 2 is selected according to the tag draft hit H1 and is outputted to the cache data write-out port 8.

Still referring to FIG. 1, in actual use of the cache memory of the embodiment according to the present invention, the cache address port 6, the cache data write-in port 7, and the cache data write-out port 8 of the cache memory can be electrically connected to a processor (not shown). Each of the cache ways of the tag memory array 1 and the data memory array 2 can operate in an "ordinary cache mode" (e.g., the mode bit=0) or a "reconfiguration mode" (e.g., the mode bit=1) according to the mode byte B. Operation of the ordinary cache mode is substantially the same as the conventional cache memory. The data address from the processor can be inputted to the cache address port 6. The data address can be represented as a conventional cache memory address locating method in which the set index will be simultaneously sent to the tag memory array 1 and the data memory array 2 to read the cache line datum, the cache line tag, and status in each cache way corresponding to the set index. The cache line tag outputted by each cache line and the tag inputted by the cache address port 6 will be sent to the comparators 53 to compare whether they are identical. The comparison result is sent to the selection module 5. The comparison result can be used in an ordinary cache memory access to judge whether a cache hit occurs. If the comparison result is identical, the datum requested by the processor is stored in the cache memory (namely, a cache hit), and the datum source is the cache line datum outputted by the cache way of the data memory array 2 having the identical comparison result. The output signal of the way selector 54 will be indirectly transmitted to the fourth multiplexer 56 to send the cache line datum to the processor through the fifth multiplexer 57 and the cache data write-out port 8. On the other hand, if the comparison result is not identical, which means the datum requested by the processor has not been loaded into the cache memory yet (namely, a cache miss), the memory controller 4 can use the swapping strategy to select the cache line of the data memory $2_i$ in the data-loadable cache way corresponding to the set index.

Still referring to FIG. 1, in order to permit the tag memory array 1 or the data memory array 2 to be reconfigured into a scratchpad memory (SPM), the corresponding cache way operates in the reconfiguration mode (the mode bit=1) according to the mode byte B of the control register 3. Furthermore, the scratchpad memory created in the tag memory array 1 and the scratchpad memory created in the data memory array 2 can respectively be referred to as a tag draft memory and a data draft memory. The base address of the tag draft memory and the base address of the data draft memory can respectively be set as the tag base address $A_1$ and the data base address $A_2$, and the capacity of the tag and data draft memories is determined by the number of the cache ways. Taking the tag draft memory as an example, the tag base address $A_1$ adding the capacity (number of the cache ways) are preserved as the access address segment of the tag draft memory. The tag draft controller 41 is used to judge whether the address in the cache address port 6 falls within the address segment of the tag draft memory. If the judgement is "true", the tag draft memory is accessed. On the other hand, the conventional cache memory access is conducted if the judgement is "false". Likewise, the data draft controller 42 can be used to judge whether the address in the cache address port 6 falls within the address segment of the data draft memory. If the judgement is "true", the data draft memory is accessed. On the other hand, the conventional cache memory access is conducted if the judgement is "false".

Still referring to FIG. 1, when the address in the cache address port 6 falls within the address segment of the data draft memory, the logic value in the data draft hit $H_2$ is 1 (or "true"), such that the first multiplexer 51 selects the data draft index $I_2$ as the set index value. When the address in the cache address port 6 falls within the address segment of the tag draft memory, the logic value in the tag draft hit $H_1$ is 1 (or "true"), such that the first multiplexer 51 selects the tag draft index $I_1$ as the set index value. On the other hand, when both of the logic values of the tag draft hit $H_1$ and the data draft hit $H_2$ are 0 (or "false"), the conventional cache memory access is conducted, and the first multiplexer 51 selects the set index of the conventional cache memory address locating method as the set index value. Likewise, by using the address segment in the cache address port 6, the third multiplexer 55 can select the output according to the data draft hit $H_2$, and the fifth multiplexer 57 can select the output according to the tag draft hit $H_1$, which can be appreciated by one having ordinary skill in the art.

As can be seen from Table 1, under different cache architectures, different processors, and different tag bit widths, the cache memory of the embodiment according to the present invention can recycle and use the storage capacity of the scratchpad memories formed by the original tag memories to increase the proportion of the useable capacity and to effectively improve the use rate of the original storage resource. Thus, given the fixed number of memory units, the capacity that can be used for storage is increased, such that the amount of data stored in the cache memory is increased to increase the number of cache hits while reducing the cache miss rate.

TABLE 1

Comparison of Useable Capacity Gain Ratios of Cache Memory of the Present Invention

| Cache architecture | Processor with similar configuration | Tag bit width | Recovered capacity of SPM | Useable capacity gain ratio |
| --- | --- | --- | --- | --- |
| Memory unit Capacity: 16 KB Cache way: 8-way Data bus: 32 bytes | Intel X Scale | 32 | 2 KB | 12.5% |
| Memory unit Capacity: 32 KB Cache way: 2-way Data bus: 32 bytes | OpenRISC | 18 | 2.3 KB | 7.2% |
| Memory unit Capacity: 4 KB Cache way: 4-way Data bus: 32 bytes | Cortex-A5 | 32 | 512B | 12.5% |
| Memory unit Capacity: 8 KB Cache way: 4-way Data bus: 64 bytes | Cortex-A53 | 64 | 1 KB | 12.5% |

In view of the foregoing technical features, the main advantages of the cache memory of the embodiment according to the present invention are that the mode byte B of the control register 3 can make the corresponding cache way to operate in the ordinary cache mode or the reconfiguration mode. In the reconfiguration mode, a scratchpad memory can be created in the tag memory array 1 or the data memory array 2 and is referred to as the tag draft memory or the data draft memory. Thus, the tag draft controller 41 can be used to judge whether the address in the cache address port 6 falls within the address segment of the tag draft memory. If the judgement is "true", the tag draft memory is accessed. On the other hand, the conventional cache memory access is conducted if the judgement is "false". Likewise, the data draft controller 42 can be used to judge whether the address in the cache address port 6 falls within the address segment of the data draft memory. If the judgement is "true", the data draft memory is accessed. On the other hand, the conventional cache memory access is conducted if the judgement is "false".

Therefore, the cache memory of the embodiment according to the present invention can recycle and use the storage capacity of the scratchpad memories formed by the original tag memories to increase the proportion of the useable capacity and to effectively improve the use rate of the original storage resource. Thus, given the fixed number of memory units, the capacity that can be used for storage is increased, such that the amount of data stored in the cache memory is increased to increase the number of cache hits while reducing the cache miss rate.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A cache memory comprising:
  a tag memory array including at least one tag memory;
  a data memory array including at least one data memory, with the at least one data memory and the at least one tag memory together forming at least one cache way;
  a control register for separately storing a mode byte, a tag base address, and a data base address, with the mode byte recording a reconfiguration status of the at least one cache way, with the tag base address being a start address of the tag memory array, and with the data base address being a start address of the data memory array;
  a memory controller electrically connected to the tag memory array, the data memory array, and the control register, with the memory controller controlling a data access state of the tag memory array according to the mode byte and the tag base address, and with the memory controller controlling a data access state of the data memory array according to the mode byte and the data base address; and
  a selection module electrically connected between the tag memory array, the data memory array, and the memory controller, with the selection module permitting the memory controller to control the tag memory array and the data memory array to access data,
  with the memory controller including a tag draft controller and a data draft controller, with the tag draft controller electrically connected to the tag memory array, the control register, the selection module, a cache address port, and a cache data write-in port, and with the data draft controller electrically connected to the data memory array, the control register, the selection module, the cache address port, and the cache data write-in port, with the tag draft controller including a tag comparator, with the tag comparator connected to the cache address port and the tag base address with the data draft controller including a data comparator connected to the cache address port and the data base address.

2. The cache memory as claimed in claim 1, with the tag draft controller further including a first tag multiplexer, a tag AND gate, a second tag multiplexer, and a third tag multiplexer, with the tag comparator electrically connected to the tag AND gate and the control register, with the first tag multiplexer electrically connected to the control register and the cache address port, with the tag AND gate electrically connected to the tag comparator and the first tag multiplexer, with the second tag multiplexer electrically connected to the tag AND gate and the cache address port, and with the third tag multiplexer electrically connected to the tag AND gate, the cache address port, and the cache data write-in port.

3. The cache memory as claimed in claim 1, with the data draft controller further including a first data multiplexer, a data AND gate, and a second data multiplexer, with the data comparator electrically connected to the data AND gate, the control register, and the cache address port, with the first data multiplexer electrically connected to the control register and the cache address port, with the data AND gate electrically connected to the data comparator and the first data multiplexer, and with the second data multiplexer electrically connected to the data AND gate and the cache address port.

4. A cache memory comprising:
  a tag memory array including at least one tag memory;
  a data memory array including at least one data memory, with the at least one data memory and the at least one tag memory together forming at least one cache way;
  a control register for storing a mode byte, a tag base address, and a data base address, with the mode byte recording a reconfiguration status of the at least one cache way, with the tag base address being a start address of the tag memory array, and with the data base address being a start address of the data memory array;
  a memory controller electrically connected to the tag memory array, the data memory array, and the control register, with the memory controller controlling a data access state of the tag memory array according to the mode byte and the tag base address, and with the memory controller controlling a data access state of the data memory array according to the mode byte and the data base address; and
  a selection module electrically connected between the tag memory array, the data memory array, and the memory controller, with the selection module permitting the memory controller to control the tag memory array and the data memory array to access data,
  with the memory controller including a tag draft controller and a data draft controller, with the tag draft controller electrically connected to the tag memory array, the control register, the selection module, a cache address port, and a cache data write-in port, and with the data draft controller electrically connected to the data memory array, the control register, the selection module, the cache address port, and the cache data write-in port, with the tag memory array including a tag input port, a tag address port, and a tag output port, with the data memory array including a data input port, a data address port, and a data output port, with the selection module including a first multiplexer, a second multiplexer, a plurality of comparators, a way selector, a third multiplexer, a fourth multiplexer, and a fifth multiplexer, with the first multiplexer electrically connected to the tag address port of the tag memory array, the data address port of the data memory array, and the tag draft controller and the data draft controller of the memory controller, with the second multiplexer electrically connected to the fifth multiplexer, the tag output port of the tag memory array, and the tag draft controller of the memory controller, with the plurality of comparators electrically connected to the way selector, the tag output port, and the cache address port, with the third multiplexer electrically connected to the way selector, the fourth multiplexer, and the data draft controller of the memory controller, with the fourth multiplexer electrically connected to the third multiplexer, the fifth multiplexer, and the data output port of the data memory array, and with the fifth multiplexer electrically connected to the second multiplexer, the fourth multiplexer, the tag draft controller of the memory controller, and a cache data write-out port.

* * * * *